No. 657,139. Patented Sept. 4, 1900.
W. D. STANSBURY.
SHUTTER FASTENER.
(Application filed Dec. 29, 1899.)
(No Model.)
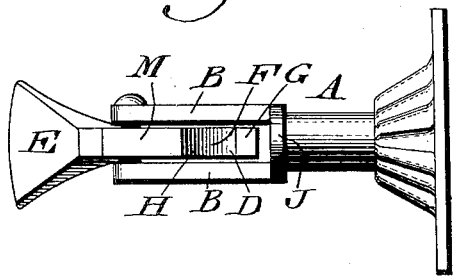
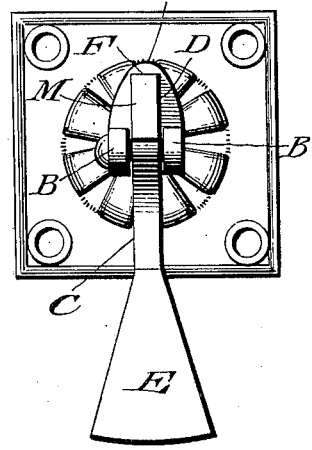
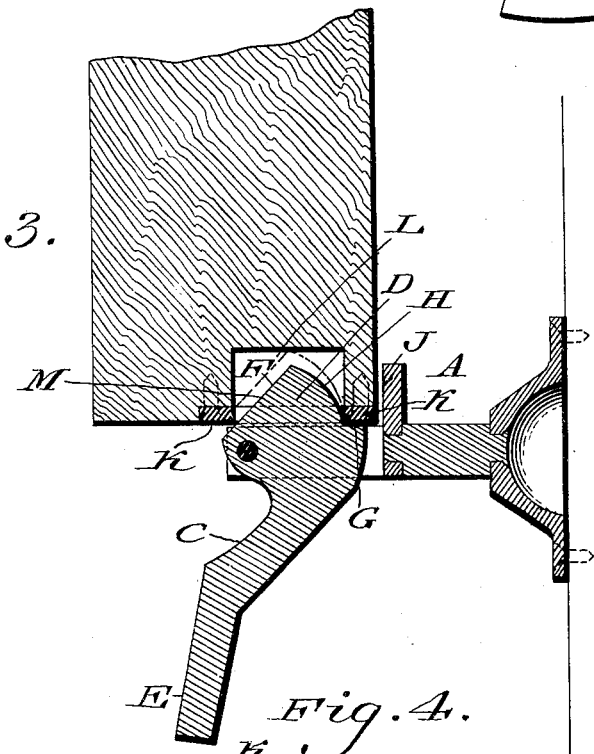
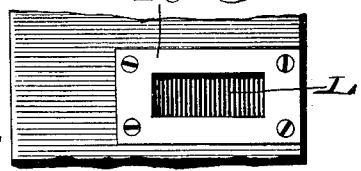
Witnesses
Inventor
William D. Stansbury
Attorneys

UNITED STATES PATENT OFFICE.

WILLIAM D. STANSBURY, OF JENKINTOWN, PENNSYLVANIA.

SHUTTER-FASTENER.

SPECIFICATION forming part of Letters Patent No. 657,139, dated September 4, 1900.

Application filed December 29, 1899. Serial No. 741,910. (No model.)

*To all whom it may concern:*

Be it known that I, WILLIAM D. STANSBURY, a citizen of the United States, residing at Jenkintown, in the county of Montgomery, State of Pennsylvania, have invented a new and useful Improvement in Shutter-Fasteners, which improvement is fully set forth in the following specification and accompanying drawings.

My invention consists of a shutter-fastener of the order of a turnbuckle, the same being constructed as hereinafter described and its novel features pointed out in the claims.

Figure 1 represents a top or plan view of a shutter-fastener embodying my invention. Fig. 2 represents a front elevation thereof. Fig. 3 represents a vertical section thereof. Fig. 4 represents a bottom plan view of the adjacent portion of the shutter.

Similar letters of reference indicate corresponding parts in the drawings.

Referring to the drawings, A designates a shank which is adapted to be secured to the proper portion of the wall of a building adjacent to the place of location of a shutter when in open position. B designates ears which project forward from said shank and have mounted thereon the gravitating latch C, which is formed of the head D and weighted arm E, pendent therefrom, said head being eccentrically mounted on said ears and having somewhat converging sides forming the upwardly-projecting angular nose F, at the base of the inner face H of which is the shoulder G, said face being segmental for convenience of operation of the nose when it rides on the contiguous part of the shutter with which it engages in closing.

Interposed between the ears B and shank A is the shoulder J, which rises therefrom and serves to limit the opening motion of the shutter.

On the under side of the shutter is secured the slotted plate K, above which is the opening or mortise L in the shutter in communication with the slot of said plate, said slot and opening being adapted to receive the nose F when the shutter is open.

The operation is as follows: When the shutter in opening reaches the right-lined face M of the nose F, it depresses the latter until said face clears the contacting portion of the plate K. The nose is then no longer controlled, and so rises and enters the plate K and recess L, where it remains owing to the action of the weighted arm E, and thus the shutter is held open. Should, however, the shutter be subjected to wind, whereby its tendency is to close, the outward pressure of the plate K on the face H would cause the nose to move upwardly and forwardly and thus release the shutter; but here the shoulder G plays an important part in that it abuts upwardly against said plate K and controls the nose against rising, so that said nose remains in the shutter and preserves its fastening action. When the nose is properly lowered, it emerges from the recess L and leaves the plate K and so clears the shutter, whereby the latter is uncontrolled and may be readily removed from the fastener and closed.

The opening or mortise L may be rectangular in form or somewhat V shape, as shown in dotted line in Fig. 3.

Having thus described my invention, what I claim as new, and desire to secure by Letters Patent, is—

1. In a shutter-fastener, a gravitating head, an ear on which said head is eccentrically mounted, a securing-shank carrying said ear, a weighted arm pendent from said head, an angular nose projecting upwardly from said head, the rear upper face of said nose being segmental, and a horizontal shoulder at the base of said rear upper face.

2. In a shutter-fastener, a gravitating head, an upwardly-projecting nose thereon, a horizontal shoulder at the base of the rear upper face of said nose, a shank on which said head is mounted and a shoulder on said shank rearward of said shank on the head.

3. A shutter-fastener consisting of a gravitating head, an upwardly-projecting nose thereon, a weighted arm pendent from said head, an ear on which said head is eccentrically mounted, a securing-shank carrying said ear, a shoulder rising from said shank and a shoulder on said nose at the base of the rear upper face thereof.

WILLIAM D. STANSBURY.

Witnesses:
LLEWELYN HUGHES,
THOS. H. YORK.